United States Patent
Wang

(10) Patent No.: US 9,457,367 B2
(45) Date of Patent: Oct. 4, 2016

(54) TIRE REPAIR SOLUTION CAN

(71) Applicant: Min-Hsieng Wang, Taipei (TW)

(72) Inventor: Min-Hsieng Wang, Taipei (TW)

(*) Notice: Subject to any disclaimer, the term of this patent is extended or adjusted under 35 U.S.C. 154(b) by 218 days.

(21) Appl. No.: 14/490,693

(22) Filed: Sep. 19, 2014

(65) Prior Publication Data

US 2016/0082676 A1   Mar. 24, 2016

(51) Int. Cl.
   *B29C 73/16* (2006.01)
   *B05B 7/24* (2006.01)
   *B29L 30/00* (2006.01)

(52) U.S. Cl.
   CPC .......... *B05B 7/2402* (2013.01); *B29C 73/166* (2013.01); *B29L 2030/00* (2013.01)

(58) Field of Classification Search
   CPC ..... B29C 73/02; B29C 73/025; B29C 73/16; B29C 73/163; B29C 73/166; B05B 7/2402; B29L 2030/00
   USPC .......... 141/9, 38, 100, 105; 152/415
   See application file for complete search history.

(56) References Cited

U.S. PATENT DOCUMENTS

| | | | | |
|---|---|---|---|---|
| 6,176,285 B1* | 1/2001 | Gerresheim | ...... | B29C 73/163 152/509 |
| 6,889,723 B2* | 5/2005 | Gerresheim | ...... | B29C 73/163 141/38 |
| 6,968,869 B2* | 11/2005 | Eckhardt | ...... | B29C 73/166 141/102 |
| 7,028,720 B2* | 4/2006 | Eckhardt | ...... | B29C 73/166 141/38 |
| 7,854,242 B2* | 12/2010 | Stehle | ...... | B29C 73/166 141/38 |
| 8,016,002 B2* | 9/2011 | Yoshida | ...... | B29C 73/166 141/38 |
| 8,020,588 B2* | 9/2011 | Wang | ...... | B29C 73/166 141/100 |
| 8,505,591 B2* | 8/2013 | Eckhardt | ...... | B29C 73/166 141/100 |
| 8,627,857 B2* | 1/2014 | Chou | ...... | B29C 73/166 141/38 |
| 8,684,046 B2* | 4/2014 | Kojima | ...... | B29C 73/166 141/38 |
| 8,978,717 B2* | 3/2015 | Nakao | ...... | B29C 73/166 141/38 |
| 9,114,573 B2* | 8/2015 | Wang | ...... | B29C 73/166 |
| 9,138,946 B2* | 9/2015 | Kojima | ...... | B29C 73/166 |
| 9,308,893 B2* | 4/2016 | Wang | ...... | B29C 73/166 |
| 2008/0230142 A1* | 9/2008 | Hickman | ...... | B29C 73/166 141/38 |
| 2009/0107578 A1* | 4/2009 | Trachtenberg | ...... | B05B 9/0805 141/5 |
| 2010/0059143 A1* | 3/2010 | Wang | ...... | B29C 73/166 141/346 |
| 2012/0298255 A1* | 11/2012 | Nakao | ...... | B29C 73/166 141/38 |
| 2013/0000777 A1* | 1/2013 | Kojima | ...... | B29C 73/166 141/38 |
| 2013/0092286 A1* | 4/2013 | Chou | ...... | B60S 5/04 141/38 |
| 2015/0158257 A1* | 6/2015 | Wang | ...... | B29C 73/166 141/38 |

* cited by examiner

*Primary Examiner* — Nicolas A Arnett

(57) ABSTRACT

A tire repair solution can includes a can with a connector connected to the opening thereof. The connector has an air path and a liquid path. A mount is connected to the connector and has a protrusion which has a recess defined in the top thereof. An air passage and a liquid passage are defined in the inner end of the recess. A seal member is fitted in the recess of the mount and has an air film and a liquid film. The air film and the liquid film are located corresponding to the air passage and the liquid passage. A flexible hose is connected to the liquid passage of the mount. The air film and the liquid film are broken by air pressure and liquid pressure when in use, so that the liquid completely flows into the tire to seal the leak of the tire.

3 Claims, 5 Drawing Sheets

TIRE REPAIR SOLUTION CAN

BACKGROUND OF THE INVENTION

1. Fields of the Invention

The present invention relates to a tire repair solution can, and more particularly, to a tire repair solution can able to temporarily seal tire leak.

2. Descriptions of Related Art

The conventional tire repair solution can is disclosed in FIG. 1 and comprises a can 1 which has an opening 10, and a seal ring 11 and a cap 2 are connected to the opening 10. The cap 2 has an air path 20 and a liquid path 22, wherein a first seal rubber 23 is manually inserted into the air path 21. A connection pipe 3 is connected to the liquid path 22. A guide pipe 24 is connected to the underside of the cap 2 and has a through hole 25. A sleeve 26 is mounted to the guide pipe 24 and covers the through hole 25. A straight pipe 27 is connected to the guide pipe 24. When in use, a pump is connected to the air path 20 of the cap 2 and the connection pipe 3 is connected to the valve of the tire. The pump introduces pressurized air into the can 1 and the pressurized air enters the air path 20 and breaks through the first seal rubber 21, so that the liquid in the can 1 generates foams. The liquid then enters the guide pipe 24 via the straight pipe 27 and breaks through the second seal rubber 23, and enters the interior of the tire via the connection pipe 3. When the can 1 is used upside down, the sleeve 26 moves along the guide pipe 24 and the through hole 25 is exposed, the liquid flows through the through hole 25 and enters the interior of the tire.

The first and second seal rubbers 22, 23 have to be inserted into the air path 20 and the liquid path 22 manually. The depth that the first and second seal rubbers 22, 23 are required to meet specific requirement such that they seals the air path 20 and the liquid path 22, and on the other hand, can be broken by a pre-set pressure. This makes the assembling steps be complicated and the manufacturing cost is high. The liquid in the can 1 can flow through the through hole 25 of the guide pipe 24 and enters the tire via the air path 22 only when the can is put vertically to the ground. When the can 1 is put at an inclined angle or horizontally, the liquid in the can 1 cannot completely flow into the guide pipe 24 via the straight pipe 27, and cannot completely flow to the through hole 25 of the guide pipe 24 so as to enter the tire via the air path 22. Because the straight pipe 27 does not have proper flexibility so that it cannot be bent, and this results in difficulty when in use.

The present invention intends to provide a tire repair solution can that eliminates the shortcomings mentioned above.

SUMMARY OF THE INVENTION

The present invention relates to a tire repair solution can and comprises a can having an opening in the top thereof. A seal ring and a connector are connected to the opening. The connector has an air path and a liquid path. A room is defined in the underside of the connector. A first recess is defined in the inner end of the room and communicates with the air path and the liquid path. A mount is accommodated in the room and a protrusion extends from the top of the mount. The protrusion has a second recess defined in the top thereof. An air passage and a liquid passage are defined in the inner end of the second recess. A neck extends from the underside of the mount so as to be fitted in the opening of the can.

A seal member is located in the second recess of the mount and has an air film and a liquid film. The air film is located corresponding to the air passage and the liquid film is located corresponding to the liquid passage. A flexible hose is connected to the liquid passage of the mount.

Preferably, a threaded hole is defined in the inner end of the room and the mount has a through hole. A locking member extends through the through hole and is connected to the threaded hole to connect the mount to the connector.

Preferably, the second recess of the mount is an 8-shaped recess and the seal member is shaped to be fitted into the second recess.

The primary object of the present invention is to provide a tire repair solution can wherein the seal member prevents the liquid in the can from leakage when not in use.

Another object of the present invention is to provide a tire repair solution can wherein the air film and the liquid film are broken by air pressure and liquid pressure when in use, so that the liquid completely flows into the tire to seal the leak of the tire.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
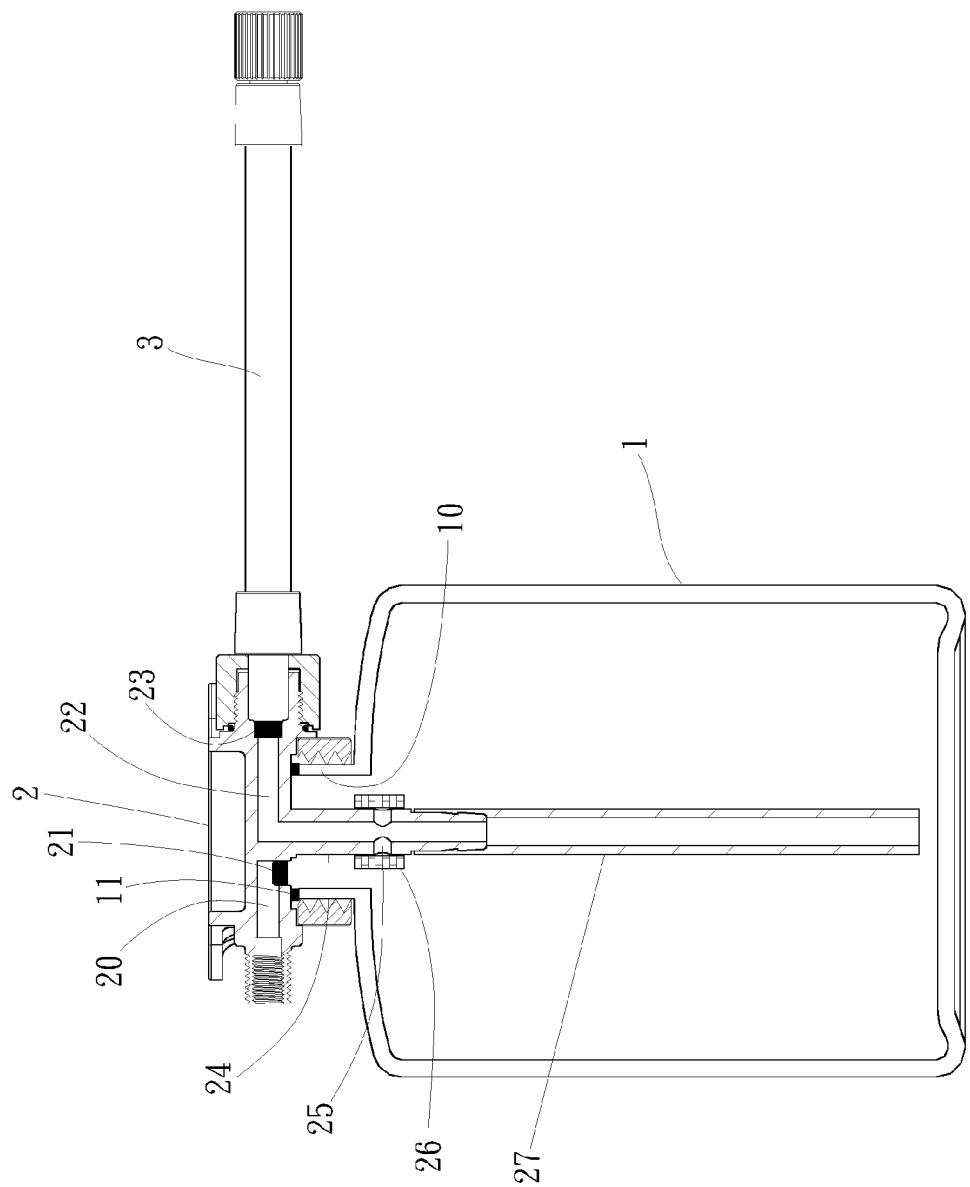
FIG. 1 is a cross sectional view of a conventional tire repair solution can.
Figure 2:
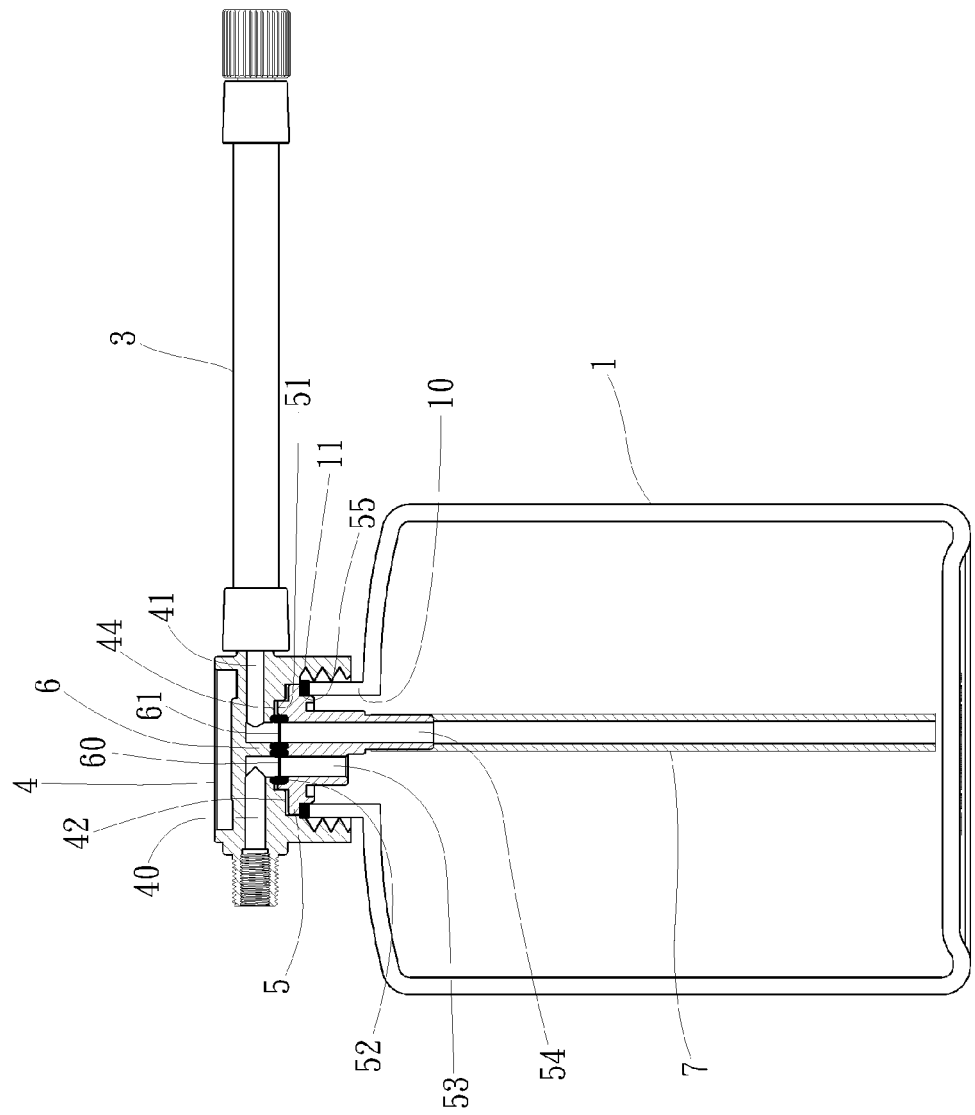
FIG. 2 is a cross sectional view of the tire repair solution can of the present invention.
Figure 4:
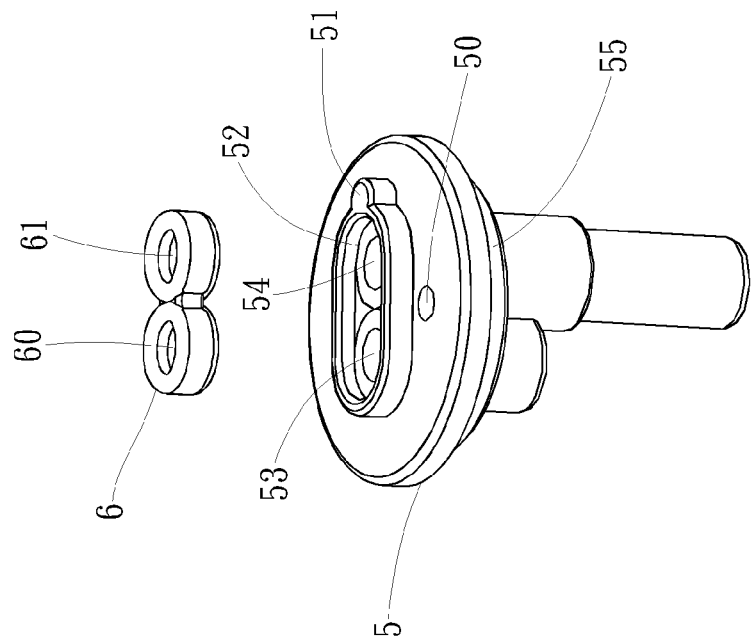
FIG. 4 shows the mount and the seal member of the tire repair solution can of the present invention.
Figure 3:
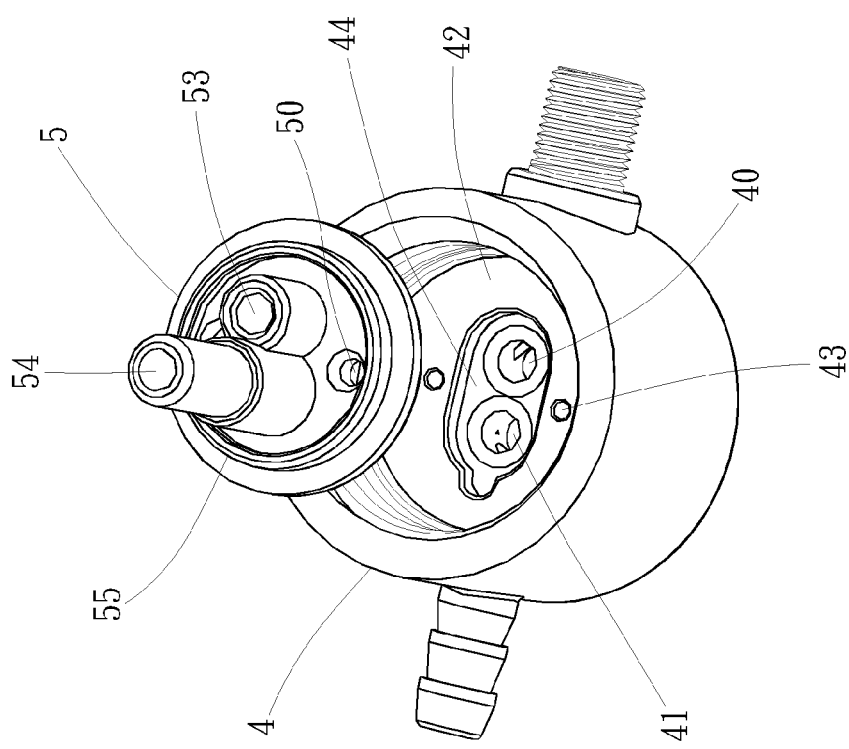
FIG. 3 shows the connector and the mount of the tire repair solution can of the present invention.
Figure 5:
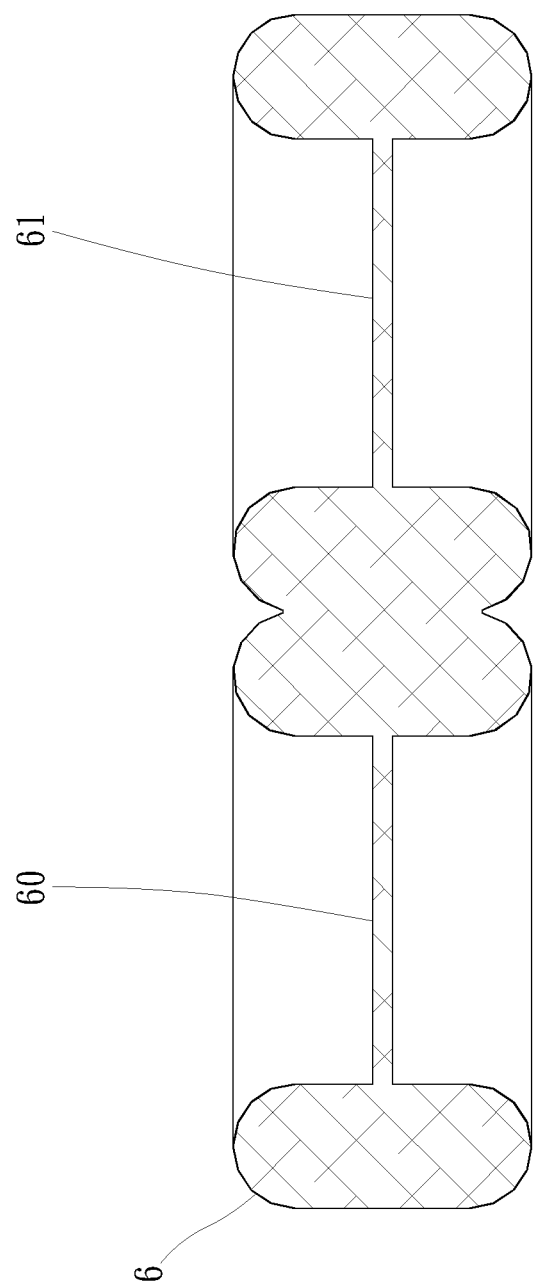
FIG. 5 shows the seal member of the tire repair solution can of the present invention.

Referring to FIGS. 2 to 5, the tire repair solution can of the present invention comprises a can 1 has an opening 10 in the top thereof, and a seal ring 11 and a connector 4 are connected to the opening 10. The connector 4 has an air path 40 and a liquid path 41 located on two ends thereof. A room 42 is defined in the underside of the connector 4. A first recess 44 is defined in the inner end of the room 42 and communicates with the air path 40 and the liquid path 41. A threaded hole 43 is defined in the inner end of the room 42.

A mount 5 is accommodated in the room 42 and a protrusion 51 extends from the top of the mount 5. The protrusion 51 has a second recess 52 defined in the top thereof. An air passage 53 and a liquid passage 54 are defined in the inner end of the second recess 52. A neck 55 extends from the underside of the mount 5 and the neck 55 is inserted into the opening 10 of the can 1. The mount 5 has a through hole 50 so that a locking member extends through the through hole 50 and is connected to the threaded hole 43 to connect the mount 5 to the connector 4.

A seal member 6 located in the second recess 52 of the mount 5 and has an air film 60 and a liquid film 61. The air film 60 is located corresponding to the air passage 53 and the liquid film 61 is located corresponding to the liquid passage

54. The second recess 52 of the mount 5 is an 8-shaped recess and the seal member 6 is shaped to be fitted into the second recess 52. A flexible hose 7 connected to the liquid passage 54 of the mount 5.

When assembling the device, the seal member 6 is fitted in the second recess 52 of the mount 5 so that the air film 60 is located corresponding to the passage 53 and the liquid film 61 is located corresponding to the liquid passage 54. The other side of the air film 60 is located corresponding to the air path 40 and the other side of the liquid film 61 is located corresponding to the liquid path 41. The protrusion 51 is then inserted into the first recess 44 of the connector 4. A locking member extends through the through hole 50 and is connected to the threaded hole 43 to connect the mount 5 to the connector 4. The flexible hose 7 is connected to the liquid passage 54 of the mount 5. The seal ring 11 is connected to the neck 55 and located at the top edge of the opening 10 of the can 1 to seal the can 1.

Figure 6:
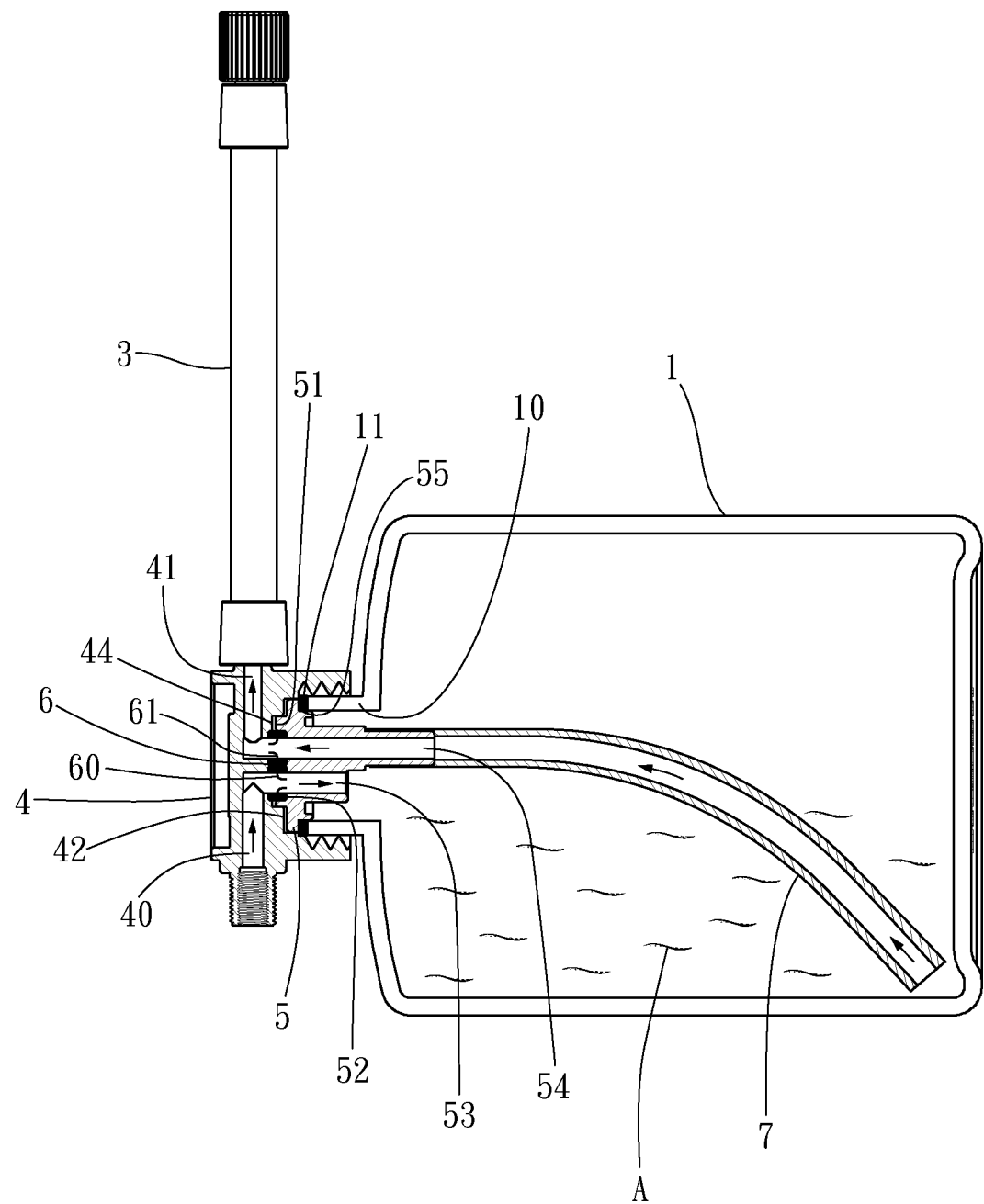
FIG. 6 shows that the tire repair solution can of the present invention is in use.

When in use, as shown in FIG. 6, get a pump to be connected with the air path 40 of the connector 4 and the connection pipe 3 is connected to the valve of the tire. The pump is activated to introduce pressurized air into the cab 1 and the pressurized air enters the air path 40 and breaks through the air film 60, so that the liquid in the can 1 generates foams. The liquid then enters the flexible pipe 7 and breaks through the liquid film 61 via the liquid passage 54. The liquid then enters the interior of the tire via the liquid path 41. The seal ring 11 and the air film 60 and the liquid film 61 prevent the liquid "A" from leakage. By the pressure of the air and the liquid "A", the air film 60 and the liquid film 61 are broken so that the liquid "A" is able to completely flow into the tire to seal the leak.

While we have shown and described the embodiment in accordance with the present invention, it should be clear to those skilled in the art that further embodiments may be made without departing from the scope of the present invention.

What is claimed is:

1. A tire repair solution can comprising:
 a can having an opening in a top thereof, a seal ring and a connector connected to the opening, the connector having an air path and a liquid path, a room defined in an underside of the connector, a first recess defined in an inner end of the room and communicating with the air path and the liquid path;
 a mount accommodated in the room and a protrusion extending from a top of the mount, the protrusion having a second recess defined in a top thereof, an air passage and a liquid passage defined in an inner end of the second recess, a neck extending from an underside of the mount;
 a seal member located in the second recess of the mount and having an air film and a liquid film, the air film located corresponding to the air passage and the liquid film located corresponding to the liquid passage, and
 a flexible hose connected to the liquid passage of the mount.

2. The device as claimed in claim 1, wherein a threaded hole is defined in the inner end of the room, the mount has a through hole, a locking member extends through the through hole and connected to the threaded hole to connect the mount to the connector.

3. The device as claimed in claim 1, wherein the second recess of the mount is an 8-shaped recess and the seal member is shaped to be fitted into the second recess.

* * * * *